(12) United States Patent
Eiland et al.

(10) Patent No.: US 11,675,397 B2
(45) Date of Patent: Jun. 13, 2023

(54) INFORMATION HANDLING SYSTEM WITH AIRFLOW AND ACOUSTICS VANE FOR HARD DISK DRIVE THROUGHPUT

(71) Applicant: DELL PRODUCTS, LP, Round Rock, TX (US)

(72) Inventors: Richard Eiland, Austin, TX (US); Chris E. Peterson, Austin, TX (US); Paul Waters, Austin, TX (US); Eduardo Escamilla, Round Rock, TX (US); Juan Torres-Gonzalez, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 332 days.

(21) Appl. No.: 17/113,575

(22) Filed: Dec. 7, 2020

(65) Prior Publication Data

US 2022/0179462 A1 Jun. 9, 2022

(51) Int. Cl.
*G06F 1/18* (2006.01)
*G06F 1/20* (2006.01)

(52) U.S. Cl.
CPC .............. *G06F 1/181* (2013.01); *G06F 1/185* (2013.01); *G06F 1/187* (2013.01); *G06F 1/20* (2013.01)

(58) Field of Classification Search
CPC . G06F 1/20; G06F 1/206; G06F 1/187; G06F 1/203; G06F 1/1632; G06F 1/184; G06F 1/185; G06F 1/1658; H05K 7/20727; H05K 7/20181; H05K 7/20172; H05K 7/20736; H05K 7/2019; H05K 7/20145; H05K 7/20209; H05K 7/20718; H05K 7/20836; H05K 7/1489; H05K 7/1487; H05K 7/20581; H05K 7/207; H05K 7/20136; H05K 7/20618; H05K 7/20709; F04D 25/166; F04D 25/14; F04D 19/002; F04D 29/646; G11B 33/142; F24F 7/007; F24F 11/0001; Y10T 137/7898; Y10T 29/49329; Y10T 29/49327
See application file for complete search history.

(56) References Cited

U.S. PATENT DOCUMENTS

| | | | | | |
|---|---|---|---|---|---|
| 6,005,770 | A | * | 12/1999 | Schmitt | G06F 1/20 361/679.48 |
| 6,011,689 | A | * | 1/2000 | Wrycraft | G06F 1/20 361/679.48 |
| 6,031,717 | A | * | 2/2000 | Baddour | G06F 1/20 361/679.48 |

(Continued)

*Primary Examiner* — Michael A Matey
(74) *Attorney, Agent, or Firm* — Larson Newman, LLP

(57) ABSTRACT

An information handling system includes multiple hard disk drives, a central processing unit (CPU) and memory complex, a graphics processing unit (GPU) and input/output (I/O) complex, multiple cooling fans, and first and second airflow vanes. The cooling fans pull in airflow through the hard disk drives and push the airflow through both the CPU and memory complex and the GPU and I/O complex. The first and second airflow vanes are located between the hard disk drives and the cooling fans. The first and second vanes are in a first configuration when the information handling system is in a CPU and memory centric configuration, and in a second configuration when the information handling system is in a GPU and I/O centric configuration.

20 Claims, 6 Drawing Sheets

(56) References Cited

U.S. PATENT DOCUMENTS

| | | | | |
|---|---|---|---|---|
| 6,525,935 B2* | 2/2003 | Casebolt | H05K 7/20736 | 361/679.48 |
| 6,587,340 B2* | 7/2003 | Grouell | H05K 7/2019 | 165/122 |
| 6,991,533 B2* | 1/2006 | Tsai | H05K 7/2019 | 361/695 |
| 7,646,602 B1* | 1/2010 | Tamarkin | H05K 7/20736 | 361/695 |
| 8,767,399 B2* | 7/2014 | Goto | H05K 7/20209 | 361/691 |
| 9,482,349 B2* | 11/2016 | Anderl | H05K 7/20727 | |
| 9,521,778 B2* | 12/2016 | Lin | H05K 7/20145 | |
| 10,995,771 B2* | 5/2021 | Chen | F04D 29/563 | |
| 2005/0257232 A1* | 11/2005 | Hidaka | G11B 33/126 | |
| 2006/0152901 A1* | 7/2006 | Espinoza-Ibarra | F04D 25/0613 | 361/695 |
| 2008/0239656 A1* | 10/2008 | Sasagawa | G11B 33/142 | |
| 2008/0310103 A1* | 12/2008 | Della Fiora | H05K 7/20727 | 454/259 |
| 2009/0215380 A1* | 8/2009 | Lin | F04D 25/0613 | 454/184 |
| 2011/0175007 A1* | 7/2011 | Sato | H05K 7/20172 | 251/301 |
| 2011/0236194 A1* | 9/2011 | Ge | F04D 27/00 | 138/140 |
| 2011/0259550 A1* | 10/2011 | Komaba | F16K 15/035 | 137/527 |
| 2013/0107454 A1* | 5/2013 | Wilke | H05K 7/20727 | 361/694 |
| 2013/0109290 A1* | 5/2013 | Jones | G06F 1/206 | 454/258 |
| 2013/0242504 A1* | 9/2013 | Cartes | H05K 7/20836 | 361/691 |
| 2014/0111932 A1* | 4/2014 | Fukuda | H05K 7/18 | 361/679.33 |
| 2016/0219754 A1* | 7/2016 | Anderl | F04D 25/166 | |
| 2017/0130736 A1* | 5/2017 | Cruz | F04D 29/5813 | |
| 2017/0160775 A1* | 6/2017 | Sun | G06F 1/20 | |
| 2017/0202111 A1* | 7/2017 | Huang | H05K 7/1487 | |
| 2017/0344078 A1 | 11/2017 | Abdul-Razzak | | |
| 2019/0116688 A1* | 4/2019 | Chu | G06F 1/203 | |
| 2019/0387646 A1* | 12/2019 | Yang | H05K 7/20572 | |
| 2020/0068741 A1* | 2/2020 | Waters | G06F 1/20 | |
| 2020/0100395 A1* | 3/2020 | Bryan | H05K 7/20754 | |
| 2020/0333860 A1* | 10/2020 | Ma | H05K 7/20727 | |
| 2021/0247730 A1* | 8/2021 | Tunks | H05K 7/20727 | |
| 2021/0270278 A1* | 9/2021 | Gao | F04D 29/403 | |
| 2022/0201900 A1* | 6/2022 | Ma | H05K 7/20736 | |

* cited by examiner

INFORMATION HANDLING SYSTEM WITH AIRFLOW AND ACOUSTICS VANE FOR HARD DISK DRIVE THROUGHPUT

FIELD OF THE DISCLOSURE

The present disclosure generally relates to information handling systems, and more particularly relates to an information handling system with airflow and acoustics vane for hard disk drive throughput.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes multiple hard disk drives, a central processing unit (CPU) and memory complex, a graphics processing unit (GPU) and input/output (I/O) complex, multiple cooling fans, and first and second airflow vanes. The cooling fans pull in airflow through the hard disk drives and push the airflow through both the CPU and memory complex and the GPU and I/O complex. The first and second airflow vanes are located in between the hard disk drives and the cooling fans. The first and second vanes are in a first configuration when the information handling system is in a CPU and memory centric configuration, and in a second configuration when the information handling system is in a GPU and I/O centric configuration.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
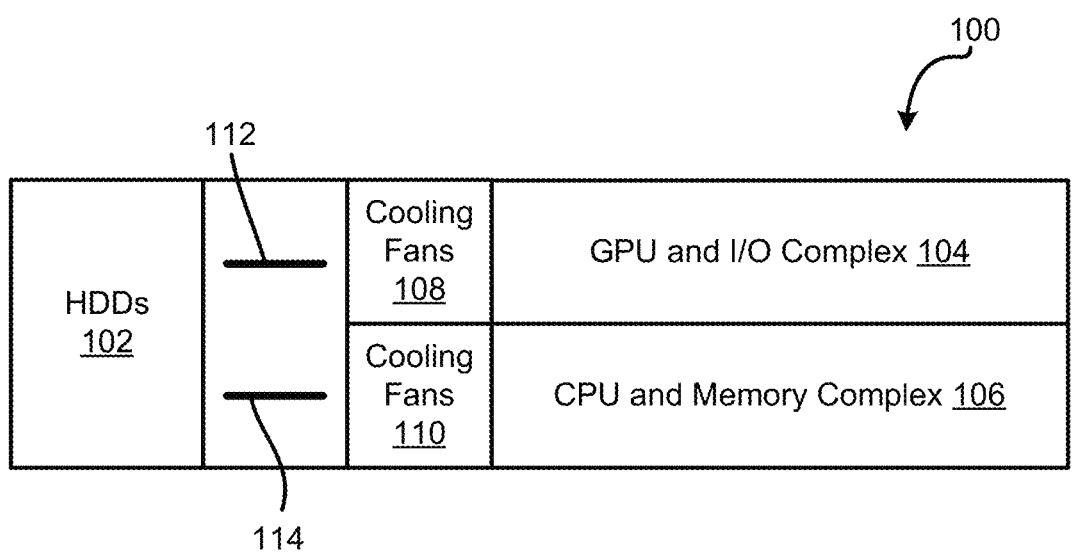
FIG. 1 is a block diagram of a portion of an information handling system according to at least one embodiment of the disclosure.

FIG. 1 shows an information handling system or server 100 in physical communication with a portion motherboard 102 of an information handling system according to at least one embodiment of the disclosure. For purpose of this disclosure information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price.

Information handling system 100 includes one or more hard disk drives (HDDs) 102, a graphics processing unit (GPU) and input/output (I/O) complex 104, a central processing unit (CPU) and memory complex 106, rows of cooling fans 108 and 110, and airflow vanes 112 and 114. In certain examples, GPU and I/O complex 104 may include any suitable number of GPUs and I/O devices. In an example, CPU and memory complex 106 may include any suitable number of CPUs and memory devices. One of ordinary skill in the art would recognize that the location GPU and I/O complex 104 and CPU and memory complex 106 within information handling system is merely an example, such that the locations of the GPU and I/O complex and CPU and memory complex may switch without varying from the scope of this disclosure. Additionally, in different examples, GPU and I/O complex 104 may be replaced with another CPU and memory complex 106, the complexes may be completely different components or the like without varying from the scope of this disclosure. Each of the rows of cooling fans 108 and 110 may include any suitable number of cooling fans. In certain examples, information handling system 100 may be any suitable system including, but not limited to, a 4U server, and a 2U server. One of ordinary skill in the art would recognize that information handling system 100 may include additional components over those shown in FIG. 1 without varying from the scope of this disclosure.

In an example, airflow vanes 112 and 114 may be located in any suitable location to direct airflow within information handling system 100. For example, airflow vanes 112 and 114 may be located in between HDDs 102 and rows of cooling fans 108 and 110. In certain examples, rows of cooling fans 108 and 110 may pull airflow from an ambient source outside of information handling system 100 through HDDs 102, and then may push the airflow across GPU and I/O devices complex 104 and across CPU and memory devices complex 106.

While airflow vanes 112 and 114 are illustrated in a horizontal orientation, the airflow vanes may be placed in a vertical orientation based on acoustical sources and needed airflow without varying from the scope of this disclosure. In different examples, airflow vanes 112 and 114 may be positioned in any suitable manner or orientation to direct airflow evenly toward both GPU and I/O devices complex 104 and CPU and memory devices complex 106, to direct the airflow mainly toward the GPU and I/O devices complex, or to direct the airflow mainly toward the CPU and memory devices complex as will be described with respect to FIGS. 2-6 below.

Figure 2:
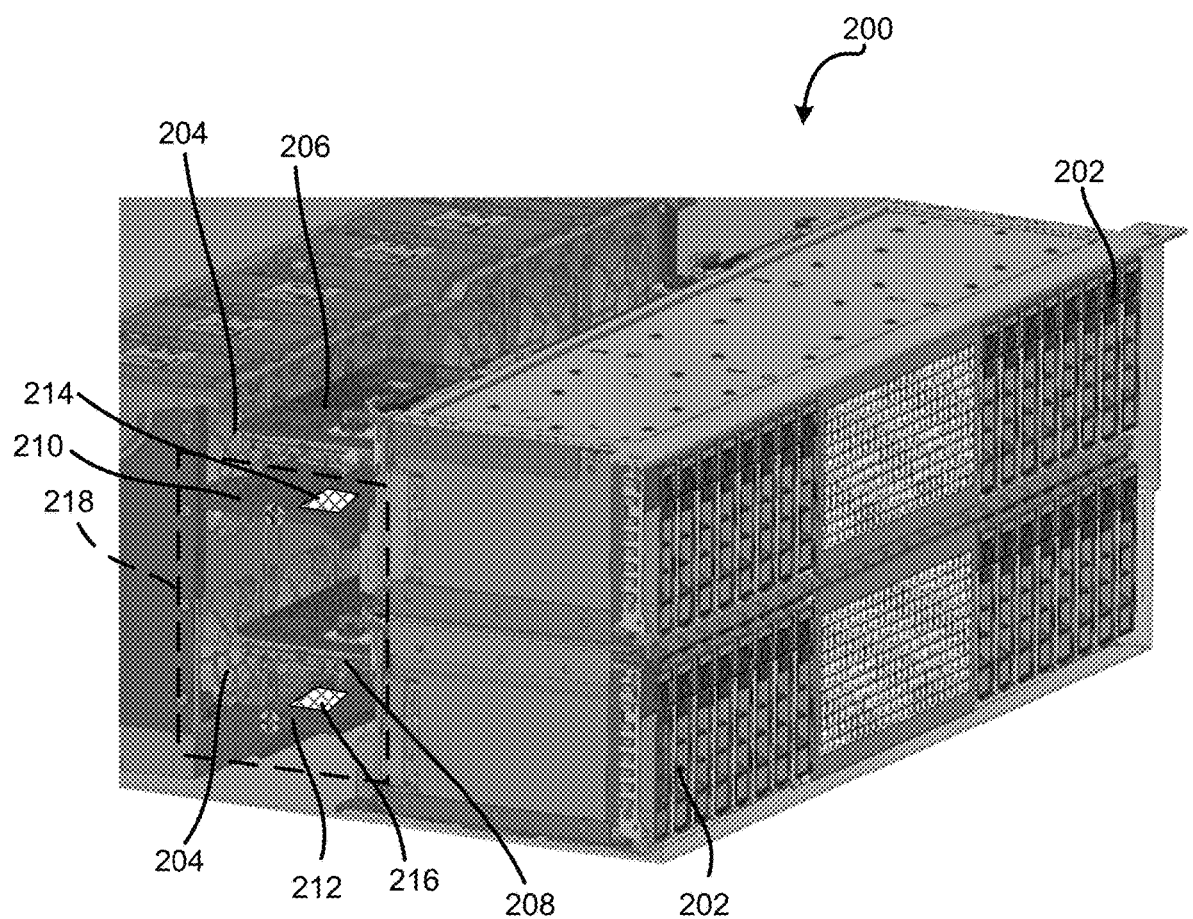
FIG. 2 is a perspective view of a portion of the information handling system according to at least one embodiment of the present disclosure.

FIG. 2 shows a portion of an information handling system 200 according to at least one embodiment of the present disclosure. Information handling system 200 includes multiple HDDs 202, cooling fans 204, additional components 206 and 208, and airflow vanes 210 and 212. In an example, components 206 and 208 may be any suitable components and may be connected to a backplane of information handling system 200. For example, components 206 and 208 may be memory controllers, memory devices, or the like. Airflow vane 210 includes an acoustically absorbent material 214 to substantially cover the entire surface of the airflow vane. Similarly, airflow vane 212 includes an acoustically absorbent material 216 to substantially cover the entire surface of the airflow vane. One of ordinary skill in the art would recognize that acoustically absorbent materials 214 and 216 are illustrated on a portion of respective airflow vanes 210 and 212, the acoustically absorbent materials substantially covers the entire surface of the airflow vanes. In an example, as described below, the surface area of acoustically absorptive materials 214 and 216 may be such to provide a maximum application of the acoustically absorptive material on airflow vanes 210 and 212 within an airflow path containing an acoustic disturbance. In certain examples, acoustically absorptive materials 214 and 216 may be the same material or may be different materials.

In an example, racks of HDDs 202 may include any suitable HDDs including, but not limited to, rotational HDDs. Rotational HDDs 202 may have any suitable rotational speed including, but not limited to, 7,200 rotations per minute (rpm), 10,000 rpm, and 15,000. In certain examples, HDDs 202, GPU and I/O complex 104, and CPU and memory complex 106 require cooling from cooling fans 204. HDDs 202 may need to maintain input/output (I/O) throughput performance. However, the I/O throughput of HDDs 202 may be degraded based on acoustical and vibration disturbances created by cooling fans 204. Thus, cooling fans 204 increasing the airflow to cool HDDs 202, GPU and I/O complex 104, and CPU and memory complex 106 may also increase acoustical and vibration disturbances to the HDDs. In an example, a direction of airflow within information handling system 200 may depend on components and the locations of the components within the information handling system. Acoustical disturbances caused by cooling fans 204 may be reduced by exposure of the sound in the airflow to acoustically absorbent material 214 and 216 on respective airflow vanes 210 and 212 within the space between HDDs 102 and cooling fans 204, but the structures and the acoustically absorbent material on the airflow vanes may increase impedance of the airflow. In an example, airflow vanes 210 and 212 may reduce acoustical disturbances from cooling fans 204 but contribute impedance of the airflow. In this example, orientations of airflow vanes 210 and 212 may be changed to compensate for the impact on impedance by the airflow vanes. For example, the orientations of airflow vanes 210 and 212 may be set to prevent the impact of the impedance reduce cooling to all of the downstream components, and to direct the airflow to best meet the cooling needs of the downstream components, such as direct the airflow to downstream components that need additional cooling as will be described in more detail with respect to FIGS. 5 and 6 below. Area 218 of information handling system 200 is shown in FIG. 3.

Figure 3:
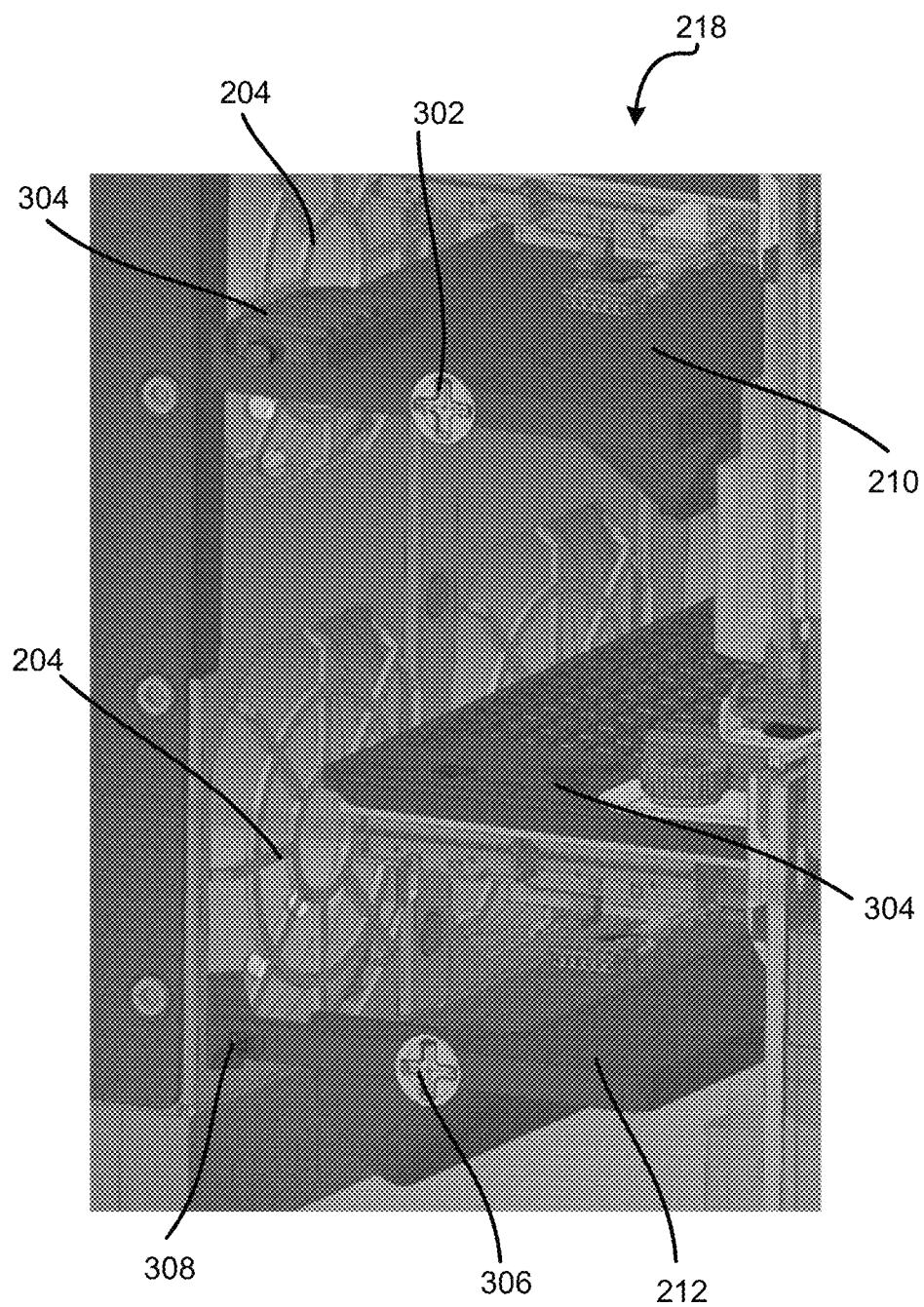
FIG. 3 is an enlarged view of airflow vanes located in between cooling fans and hard disk drives of the information handling system according to at least one embodiment of the present disclosure.
Figure 4:
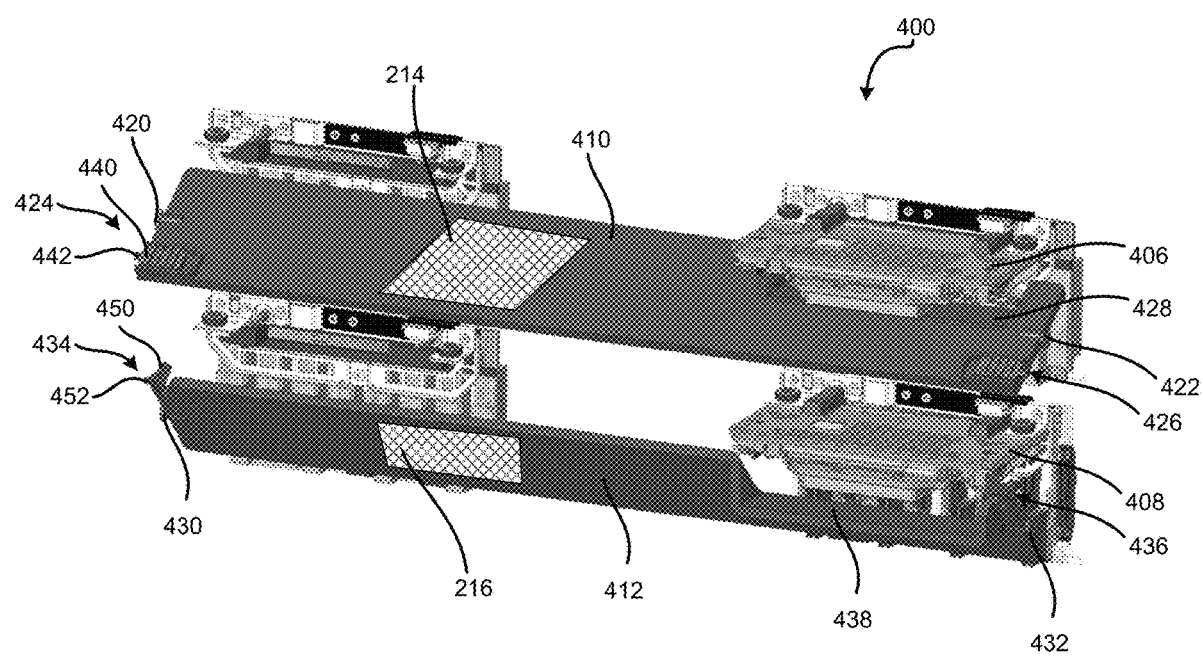
FIG. 4 is a perspective view of the airflow vanes of the information handling system according to at least one embodiment of the present disclosure.

FIG. 3 shows portion 218 of information handling system 200 including airflow vanes 210 and 212 located in between cooling fans 204 and HDDs of the information handling system according to at least one embodiment of the present disclosure. In an example, airflow vanes 210 and 212 may be placed in a cavity of information handling system 200 in between HDDs 202 and cooling fans 204 to disrupt acoustic disturbances generated by the cooling fans. Airflow vane 210 includes a pivot mount 302 and a latch 304. Airflow vane 212 includes a pivot mount 306 and a latch 308. While only a single pivot mount 302 and a single latch 304 are illustrated in FIG. 3 for airflow vane 210, one of ordinary skill in the art would recognize that the airflow vane may include any suitable number of pivot mounts and latches including, but not limited to, two pivot mounts and two latches as shown in FIG. 4. Similarly, while only a single pivot mount 306 and a single latch 308 are illustrated in FIG. 3 for airflow vane 212, one of ordinary skill in the art would recognize that the airflow vane may include any suitable number of pivot mounts and latches including, but not limited to, two pivot mounts and two latches as shown in FIG. 4.

In certain examples, pivot mount 302 and latch 304 may be utilized to place airflow vane 210 in any suitable orientation to direct airflow within information handling system 200. Similarly, pivot mount 306 and latch 308 may be utilized to place airflow vane 212 in any suitable orientation to further direct airflow within information handling system 200. In an example, pivot mount 302 may place airflow vane 210 in physical communication with a surface of information handling system 200, and may enable the airflow vane to rotate and be placed at different angles. Latch 304 may interface with one or more latch points within the surface of information handling system 200 to hold airflow vane 212 at a particular angle. In an example, the angle of airflow vane 212 may be any suitable angle including, but not limited to, 0 degrees, such as straight between cooling fans 204 and the HDDs, 45 degrees, and any angle in between. In an example, the orientation of airflow vanes 210 and 212 may be set and reset at any suitable point. For example, airflow vanes 210 and 212 may be set in one orientation during a factory process for information handling system 200, and may be set in another orientation by a user after the information handling system has been setup and utilized. For example, a user may remove cooling fans 202 to access airflow vanes 210 and 212 and to change an orientation of the airflow vanes.

FIG. 4 shows a portion of an information handling system 400 including components 206 and 208, and airflow vanes 410 and 412 according to at least one embodiment of the present disclosure. In an example, information handling system 400 may be any suitable information handling system, such as information handling system 100 of FIG. 1, information handling system 200 of FIG. 2, and information handling system 300 of FIG. 3. Airflow vane 410 includes pivot mounts 420 and 422, latches 424 and 426, and recess portion 428. Airflow vane 412 includes pivot mounts 430 and 432, latches 434 and 436, and recess portion 438.

In an example, airflow vanes 410 and 412 may rotate to change directions of the airflow through information handling system 400. For example, airflow vane 410 may rotate from an initial orientation perpendicular to cooling fans, such as cooling fans 204 of FIG. 3, to a secondary orientation, such as a 45 degree angle. In an example, recess portion 428 may be located in any suitable location of airflow vane 410 including, but not limited to an edge of the airflow vane nearest the HDDs and below component 406 of information handling system 400. Airflow vane 412 may rotate from an initial orientation perpendicular to cooling fans, such as cooling fans 204 of FIG. 3, to a secondary orientation, such as a 45 degree angle. In an example, recess portion 438 may be located in any suitable location of airflow vane 412 including, but not limited to an edge of the airflow vane furthest from the HDDs and below component 408 of information handling system 400. While the initial orientation and secondary orientation for airflow vanes 410 and 412 have been described in one particular manner above, one of ordinary skill in the art would recognize that the initial orientation for the airflow vanes may be any suitable angle, such as a 45 degree angle, or may be one airflow vane at an angle and the other airflow vane being perpendicular to the cooling fans. Additionally, the secondary orientation of airflow vanes 410 and 412 may perpendicular to the cooling fans without varying from the scope of this disclosure, or may be one airflow vane at an angle and the other airflow vane being perpendicular to the cooling fans.

In certain examples, latches 424 and 434 may be any suitable type of latch. In different examples, latches 424 and 434 may be the same type of latch or may be different types of latches. For example, latches 424 and 434 may be a spring loaded latch, a molded latch, a friction latch, a clutch latch, or the like. Latch 424 includes a release portion 440 and a pin 443. In an example, latch 424 may also include a spring to bias the latch toward an extended or locked position. In the extended or locked position, pin 442 may be inserted within a latch point of a surface of information handling system 400 to hold airflow vane 410 in a particular orientation. To unlock and reposition latch 424, an individual may exert a force on the latch, via release portion 440. In response to the force exerted on release portion 440 exceeded the force of the spring, pin 442 may be removed from the latch point, such that airflow vane 410 may be repositioned within information handling system 400.

Latch 434 includes molded tension portion 450 and pin 452. In an example, the molded tension portion 450 may bias pin 452 toward an extended or locked position. In the extended or locked position, pin 452 may be inserted within a latch point of a surface of information handling system 400 to hold airflow vane 412 in a particular orientation. In response to a force being exerted on molded tension portion 450 and away from the surface of information handling system 400, pin 452 may be removed from the latch point, such that airflow vane 412 may be repositioned within the information handling system.

In an example, airflow vanes 410 and 412 may be formed from any suitable material with any suitable dimensions. For example, airflow vanes 410 and 412 may be metal with a minimal thickness to provide airflow direction without disrupting the airflow, such that an airflow impedance within information handling system 400 is minimized. In an example, airflow vanes 410 and 412 may be coated with acoustically absorptive materials 214 and 216 to reduce acoustic disturbances from cooling fans, such as cooling fans 204, from reducing an I/O throughput of HDDs, such as HDDs 202. Acoustically absorptive materials 214 and 216 may be any suitable material including, but not limited to, a foam material and a lattice-like material. In certain examples, acoustically absorptive materials 214 and 216 may be applied in any suitable thickness on airflow vanes 410 and 412. For example, the thickness of acoustically absorptive material s 214 and 216 may be set based on an acoustical frequency range to reduce within information handling system 400.

In certain examples, an orientation of airflow vanes 410 and 412 may be provided, via a pin detect, to a baseboard management controller and thermal control devices. These controllers and devices may utilize the orientation in CPU or GPU management and to control cooling fan speeds. In an example, airflow vanes 410 and 412 may be positioned within information handling system 400 in such a way as to assistance in cable management within the information handling system. For example, airflow vanes 410 and 412 may enable cables to be routed so as to not increase airflow impedance within information handling system 400.

Figure 5:
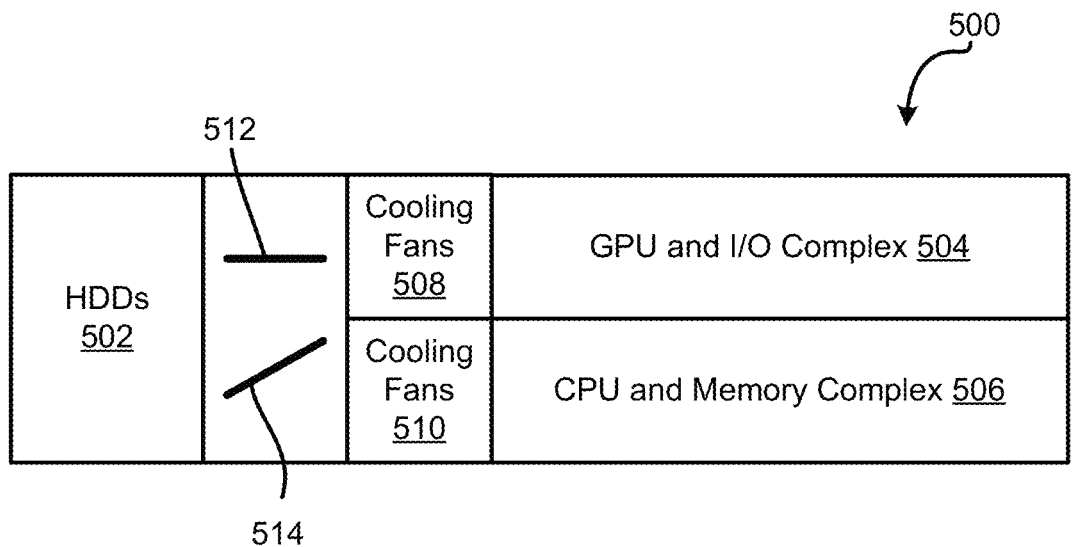
FIG. 5 is a block diagram of airflow vanes of an information handling system in a first configuration according to at least one embodiment of the disclosure.

FIG. 5 illustrates a portion of an information handling system 500 according to at least one embodiment of the disclosure. Information handling system 500 includes one or more HDDs 502, a GPU and I/O complex 504, a CPU and memory complex 506, rows of cooling fans 508 and 510, and airflow vanes 512 and 514. In certain examples, GPU and I/O complex 504 may include any suitable number of GPUs and I/O devices. In an example, CPU and memory complex 506 may include any suitable number of CPUs and memory devices.

A configuration or orientation of airflow vanes 512 and 514 may be set based on a configuration of information handling system 500. For example, if information handling system 500 is set with a GPU and I/O centric configuration, GPU and I/O complex 504 may produce a substantially larger amount of heat as compared with CPU and memory complex 506. In this example, GPU and I/O complex 504 may need more airflow as compared with CPU and memory complex 506. Thus, airflow vanes 512 and 514 may be placed in a configuration or orientation to direct a larger amount of airflow toward GPU and I/O complex 504 as compared to CPU and memory complex 506. For example, airflow vane 512 may be oriented perpendicular to HDDs 502 and cooling fans row 508, and airflow vane 514 may be oriented in an angle from HDDs up toward cooling fans row 508. In this orientation, airflow vane 514 may direct additional airflow toward GPU and I/O complex 504 as compared to CPU and memory complex 506.

Figure 6:
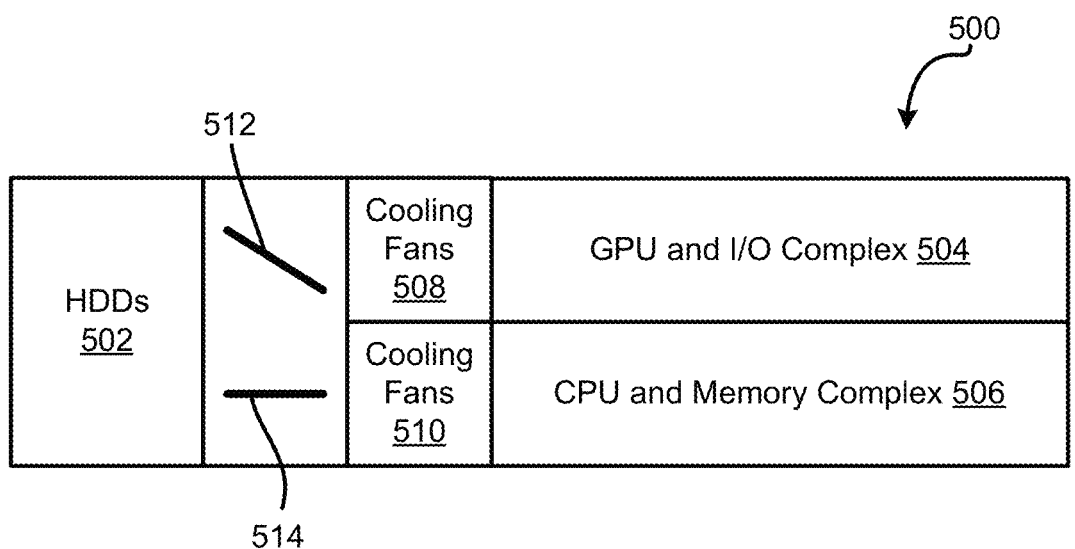
FIG. 6 is a block diagram of airflow vanes of an information handling system in a second configuration according to at least one embodiment of the disclosure.

FIG. 6 illustrates a portion of an information handling system 500 according to at least one embodiment of the disclosure. In an example, airflow vanes 512 and 514 may be positioned in a different configuration or orientation as described above with respect to FIG. 5. The configuration or orientation of airflow vanes 512 and 514 may be set based on a configuration of information handling system 500. For example, if information handling system 500 is set with a CPU and memory centric configuration, CPU and memory complex 506 may produce a substantially larger amount of heat as compared with GPU and I/O complex 504. In this example, CPU and memory complex 506 may need more airflow as compared with GPU and I/O complex 504. Thus, airflow vanes 512 and 514 may be placed in a configuration or orientation to direct a larger amount of airflow toward CPU and memory complex 506 as compared to GPU and I/O complex 504. For example, airflow vane 514 may be oriented perpendicular to HDDs 502 and cooling fans row 510, and airflow vane 512 may be oriented in an angle from the HDDs down toward cooling fans row 510. In this orientation, airflow vane 512 may direct additional airflow toward CPU and memory complex 506 as compared to GPU and I/O complex 504.

Figure 7:
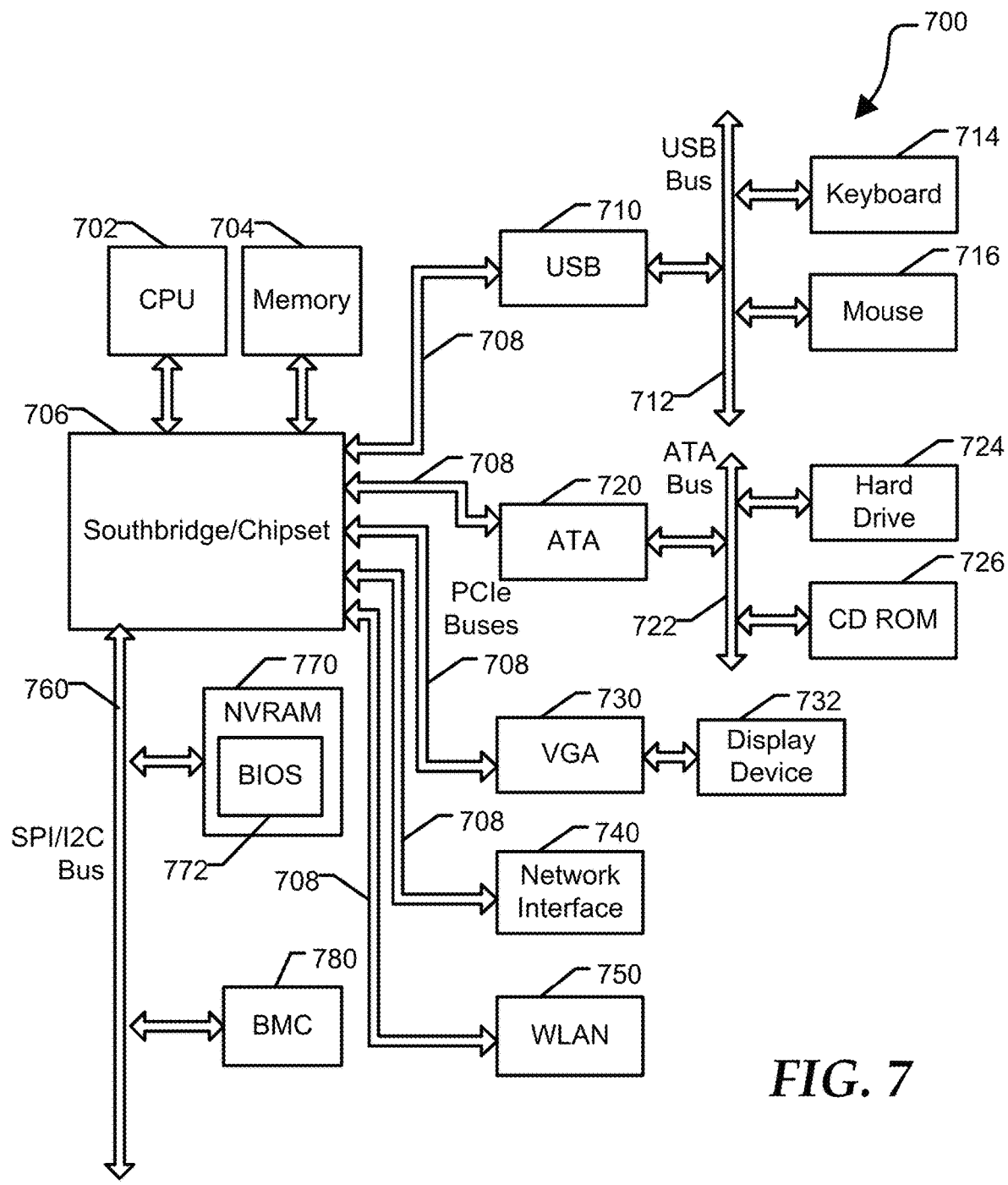
FIG. 7 is a block diagram of a general information handling system according to an at least one embodiment of the present disclosure.

FIG. 7 illustrates a general information handling system 700. Information handling system 700 including a processor 702, a memory 704, a southbridge/chipset 706, one or more PCIe buses 708, a universal serial bus (USB) controller 710, a USB 712, a keyboard device controller 714, a mouse device controller 716, a configuration an ATA bus controller 720, an ATA bus 722, a hard drive device controller 724, a compact disk read only memory (CD ROM) device controller 726, a video graphics array (VGA) device controller 730, a network interface controller (NIC) 740, a wireless local area network (WLAN) controller 750, a serial peripheral interface (SPI) bus 760, a NVRAM 770 for storing BIOS 772, and a baseboard management controller (BMC) 780. In an example, chipset 706 may be directly connected to an individual end point via a PCIe root port within the chipset and a point-to-point topology as shown in FIG. 7. BMC 780 can be referred to as a service processor or embedded controller (EC). Capabilities and functions provided by BMC 780 can vary considerably based on the type of information handling system. For example, the term baseboard management system is often used to describe an embedded processor included at a server, while an embedded controller is more likely to be found in a consumer-level device. As disclosed herein, BMC 780 represents a processing device different from CPU 702, which provides various management functions for information handling system 700. For example, an embedded controller may be responsible for power management, cooling management, and the like. An embedded controller included at a data storage system can be referred to as a storage enclosure processor.

System 700 can include additional processors that are configured to provide localized or specific control functions, such as a battery management controller. Bus 760 can include one or more busses, including a SPI bus, an I2C bus, a system management bus (SMBUS), a power management bus (PMBUS), and the like. BMC 780 can be configured to provide out-of-band access to devices at information handling system 700. As used herein, out-of-band access herein refers to operations performed prior to execution of BIOS 772 by processor 702 to initialize operation of system 700.

BIOS 772 can be referred to as a firmware image, and the term BIOS is herein used interchangeably with the term firmware image, or simply firmware. BIOS 772 includes instructions executable by CPU 702 to initialize and test the hardware components of system 700, and to load a boot loader or an operating system (OS) from a mass storage device. BIOS 772 additionally provides an abstraction layer for the hardware, such as a consistent way for application programs and operating systems to interact with the keyboard, display, and other input/output devices. When power is first applied to information handling system 700, the system begins a sequence of initialization procedures. During the initialization sequence, also referred to as a boot sequence, components of system 700 are configured and enabled for operation, and device drivers can be installed. Device drivers provide an interface through which other components of the system 700 can communicate with a corresponding device.

Information handling system 700 can include additional components and additional busses, not shown for clarity. For example, system 700 can include multiple processor cores, audio devices, and the like. While a particular arrangement of bus technologies and interconnections is illustrated for the purpose of example, one of skill will appreciate that the techniques disclosed herein are applicable to other system architectures. System 700 can include multiple CPUs and redundant bus controllers. One or more components can be integrated together. For example, portions of southbridge/chipset 706 can be integrated within CPU 702. Additional components of information handling system 700 can include one or more storage devices that can store machine-executable code, one or more communications ports for communicating with external devices, and various input and output (I/O) devices, such as a keyboard, a mouse, and a video display. An example of information handling system 700 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

In an example, information handling system 700 may be any suitable device including, but not limited to, information handling system 700 and servers 712, 714, and 716 of FIG. 7. Information handling system 700 can include a set of instructions that can be executed to cause the information handling system to perform any one or more of the methods or computer based functions disclosed herein. The information handling system 700 may operate as a standalone device or may be connected to other computer systems or peripheral devices, such as by a network.

In a networked deployment, the information handling system 700 may operate in the capacity of a server or as a client user computer in a server-client user network environment, or as a peer computer system in a peer-to-peer (or distributed) network environment. The information handling system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single information handling system 700 is illustrated, the term "system" shall also be taken to include any collection of systems or sub-systems that individually or jointly execute a set, or multiple sets, of instructions to perform one or more computer functions.

The information handling system 700 can include a disk drive unit and may include a computer-readable medium, not shown in FIG. 7, in which one or more sets of instructions, such as software, can be embedded. Further, the instructions may embody one or more of the methods or logic as described herein. In a particular embodiment, the instructions may reside completely, or at least partially, within system memory 704 or another memory included at system 700, and/or within the processor 702 during execution by the information handling system 700. The system memory 704 and the processor 702 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a plurality of hard disk drives;
   a central processing unit (CPU) and memory complex;
   a graphics processing unit (GPU) and input/output (I/O) complex;
   a plurality of cooling fans to pull an airflow through the hard disk drives and to push the airflow through both the CPU and memory complex and the GPU and I/O complex; and
   an airflow vane located in between the hard disk drives and the cooling fans, the airflow vane in a first configuration when the information handling system is in a CPU and memory centric configuration, and the airflow vane in a second configuration when the information handling system is in a GPU and I/O centric configuration.

2. The information handling system of claim 1, wherein the airflow vane is coated in an acoustically absorptive material.

3. The information handling system of claim 2, wherein a thickness of the acoustically absorptive material is set based on a frequency range of an acoustical disturbance.

4. The information handling system of claim 3, wherein reduction of the acoustical disturbance by the vane maintains input/output (I/O) throughput of the hard disk drives.

5. The information handling system of claim 1, wherein the airflow vane comprises:
   a latch to hold the airflow vane in either the first configuration or the second configuration.

6. The information handling system of claim 1, wherein the airflow vane comprises:
   a pivot mount to hold the airflow vane within the information handling system, and to pivot to enable the airflow vane to transition between the first configuration and the second configuration.

7. The information handling system of claim 1, wherein the airflow vane comprises:
   a recess portion on a first end of the airflow vane, the recess portion provides clearance of the airflow vane with a component of a backplane of the information handling system.

8. The information handling system of claim 1, wherein the hard disk drives are sensitive to both vibrations and acoustical disturbances.

9. An information handling system comprising:
   a plurality of hard disk drives;
   a central processing unit (CPU) and memory complex;
   a graphics processing unit (GPU) and input/output (I/O) complex;

a plurality of cooling fans to pull an airflow through the hard disk drives and to push the airflow through both the CPU and memory complex and the GPU and I/O complex; and first and second airflow vanes located between the hard disk drives and the cooling fans, the first and second vanes in a first configuration when the information handling system is in a CPU and memory centric configuration, and the first and second vanes in a second configuration when the information handling system is in a GPU and I/O centric configuration.

10. The information handling system of claim 9, wherein the first and second airflow vanes are coated in an acoustically absorptive material.

11. The information handling system of claim 10, wherein a thickness of the acoustically absorptive material is set based on a frequency range of an acoustical disturbance.

12. The information handling system of claim 11, wherein reduction of the acoustical disturbance by the first and second vanes maintains input/output (I/O) throughput of the hard disk drives.

13. The information handling system of claim 9, wherein the first airflow vane comprises:
a latch to hold the first airflow vane in either the first configuration or the second configuration.

14. The information handling system of claim 9, wherein the first airflow vane comprises:
a pivot mount to hold the first airflow vane within the information handling system, and to pivot to enable the first airflow vane to transition between the first configuration and the second configuration.

15. The information handling system of claim 9, wherein the first airflow vane comprises:
a recess portion on a first end of the first airflow vane, the recess portion provides clearance of the first airflow vane with a component of a backplane of the information handling system.

16. The information handling system of claim 9, wherein the hard disk drives are sensitive to both vibrations and acoustical disturbances.

17. An information handling system comprising:
a plurality of hard disk drives;
a central processing unit (CPU) and memory complex;
a graphics processing unit (GPU) and input/output (I/O) complex;
a plurality of cooling fans to pull an airflow through the hard disk drives and to push the airflow through both the CPU and memory complex and the GPU and I/O complex; and
first and second airflow vanes located in between the hard disk drives and the cooling fans, the first airflow vane including a latch to hold the first airflow vane in either a first configuration or a second configuration, the first and second vanes being in the first configuration when the information handling system is in a CPU and memory centric configuration, and the first and second vanes being in the second configuration when the information handling system is in a GPU and I/O centric configuration, wherein the first and second airflow vanes are coated in an acoustically absorptive material.

18. The information handling system of claim 17, wherein a thickness of the acoustically absorptive material is set based on a frequency range of an acoustical disturbance.

19. The information handling system of claim 18, wherein reduction of the acoustical disturbance by the first and second vanes maintains input/output (I/O) throughput of the hard disk drives.

20. The information handling system of claim 17, wherein a physical communication with both a vibration source and a vibration sink forces an amount of vibration through the vibration sink.

* * * * *